United States Patent [19]

Patenaude

[11] Patent Number: 4,924,847
[45] Date of Patent: May 15, 1990

[54] COMBUSTION SYSTEM

[76] Inventor: Jean-Pierre Patenaude, 104 Guigues Street, Ottawa, Ontario, K1N 5H7, Canada

[21] Appl. No.: 181,576

[22] Filed: Apr. 14, 1988

Related U.S. Application Data

[63] Continuation of Ser. No. 933,350, Nov. 19, 1986, Pat. No. 4,747,781, which is a continuation of Ser. No. 757,227, Jul. 22, 1985, abandoned.

[30] Foreign Application Priority Data

Mar. 27, 1985 [CA] Canada .................................. 477685

[51] Int. Cl.$^5$ ............................ F24C 1/14; F23H 3/00
[52] U.S. Cl. ................................. 126/77; 126/163 R; 126/163 A; 110/300; 110/297; 110/195
[58] Field of Search ............. 431/328, 326; 126/91 R, 126/92 AC, 77, 163 R, 163 A, 152 R; 110/195, 297, 298, 299, 300, 245

[56] References Cited

U.S. PATENT DOCUMENTS

| | | | |
|---|---|---|---|
| 739,491 | 9/1903 | Grey | 110/300 |
| 1,552,365 | 9/1925 | Voigt | 110/300 |
| 1,559,521 | 10/1925 | Ferruse | 110/195 |
| 1,731,053 | 10/1929 | Lowe | 431/328 |
| 1,732,497 | 10/1929 | Buckley | 126/163 R |
| 1,782,229 | 11/1930 | Becker | 126/90 R |
| 1,973,149 | 9/1934 | Tulip | 126/163 |
| 1,983,709 | 12/1934 | Schmidt | 126/163 R |
| 2,361,796 | 10/1944 | Schrage | 126/163 A |
| 2,663,366 | 12/1953 | Harris | 431/326 |
| 3,170,504 | 2/1965 | Lanning | 431/328 |
| 3,237,622 | 3/1966 | Best | 126/77 |
| 3,492,986 | 2/1970 | Partiot | 126/92 |
| 3,635,644 | 1/1972 | Reid, Jr. | 431/328 |
| 3,635,651 | 1/1972 | Desty | 431/328 |
| 3,810,732 | 5/1974 | Koch | 126/92 AC |
| 3,870,459 | 3/1975 | Desty et al. | 431/328 |
| 3,885,907 | 5/1975 | Teague, Jr. | 431/328 |
| 3,954,387 | 5/1976 | Cooper | 431/328 |
| 4,063,873 | 12/1977 | Naito | 431/328 |
| 4,184,456 | 1/1980 | Taylor et al. | 122/4 D |
| 4,248,586 | 2/1981 | Cooper | 431/328 |
| 4,309,948 | 1/1982 | Zielinski | 110/263 |
| 4,377,153 | 3/1983 | Flagg | 126/77 |
| 4,414,904 | 11/1983 | Foster | 110/300 |
| 4,504,218 | 3/1985 | Mihara et al. | 431/328 |
| 4,616,627 | 10/1986 | Haygood | 126/77 |
| 4,639,213 | 1/1987 | Simpson | 431/326 |
| 4,674,973 | 6/1987 | Wright | 431/328 |

FOREIGN PATENT DOCUMENTS

| | | | |
|---|---|---|---|
| 269863 | 4/1926 | Canada . | |
| 334082 | 7/1933 | Canada . | |
| 52-45740 | 11/1977 | Japan . | |
| 55-68506 | 5/1980 | Japan . | |
| 12206 | 1/1982 | Japan | 110/300 |

Primary Examiner—Henry A. Bennet
Assistant Examiner—Denise L. Ferensic
Attorney, Agent, or Firm—Jones, Tullar & Cooper

[57] ABSTRACT

The specification describes a system for initiating and promoting combustion of fuels such as wood, coal, oil, etc. Virtually complete combustion is achieved by feeding combustion air under pressure through openings in a diffuser plate with the diameter of the opening having a calculated size and spacing therebetween. By-products of primary combustion are burned by the system. The specification also describes an exemplary wood stove and a cooking unit which utilizes the novel combustion principle.

14 Claims, 4 Drawing Sheets

COMBUSTION SYSTEM

This is a continuation of co-pending application Ser. No. 06/933,350 filed on 11/19/86, now U.S. Pat. No. 4,747,781 which was a continuation of Ser. No. 06/757,227 filed July 22, 1985, now abandoned.

This invention relates to a system for the combustion of fuels such as wood, coal, oil, etc., and more particularly to a solid fuel combustion system which results in a highly efficient conversion to usable energy while minimizing unburned, pollution producing, by-products. More specifically, the system utilizes a diffuser plate having openings of predetermined diameter and spacing for the passage of air jets to create a calibrated combustion zone to achieve a desired complete combustion of the fuel.

With the ever increasing cost of oil products and the threat of supply shortages, interest in alternate forms of heating has increased in recent years. Wood being a renewable resource, is a popular alternative and as a result a preponderance of wood burning stoves has emerged.

Many of these stoves are of the air tight variety and provide controls for regulating the flow of air to the combustion zone. Although these systems provide some control on the rate at which the fuel burns, the problem of incomplete combustions remains. In an attempt to reduce the quantity of noxious by-products of this incomplete combustion some stoves have means to extend the gas flow paths to promote secondary combustion. This approach is not totally satisfactory and the danger of chimney fires caused by an excessive build up of creosote therein remains a serious consideration of the user of a wood stove. Additionally, the extended path lengths usually are created by an arrangement of variable baffles, adding considerably to the size of the unit and of course the cost of manufacture.

A further important consideration is the size and location of an appropriate chimney. If a suitable chimney does not exist a major renovation is required to prvoide a proper exit for fuel gases.

The present invention overcomes the aforementioned problems by providing a novel system of promoting virtually complete combustion of the fuel. A chimney, as commonly known, as a part of the combustion system is not required. Further, the method finds practical application in a heating unit constructed in a manner which renders it totally portable. The combustion system can also be adapted for cooking purposes such as a barbeque or campstove.

The principle of the invention is somewhat analogous to a tuyere used in connection with a blast furnace or forge. In the present case, however, the air is delivered to the combustion zone in a specific and controlled manner so as to optimize combustion. The air is injected to form a thin combustion zone through a series of jets or openings in a plate where the jets have a specific size and are arranged in a specific configuration in order to produce interaction between air flows: efficient combustion results. Additionally, the rate of combustion may be varied and combustion is also possible in any position (sideways, upside down, etc.).

In practice the system includes a closed diffuser which has an upper plate having the aforementioned jets and a lower plate separated from the upper plate and attached thereto by side members so as to form a type of manifold. A conduit feeds into an opening in the lower plate and is connected to means for providing air under pressure to the diffuser.

The solid fuel, such as wood, rests on the upper surface of the diffuser, and after ignition, burns in a controlled manner, by regulating the flow rate of the air to the combustion zone. The air under pressure may be supplied by an air pump in which case the flow of air is dictated by the size of the orifices or jets while the output of the pump controls the velocity at which that flow of air is injected into the combustion zone.

The upper surface of the diffuser plate is provided with raised portions which hold the solid fuel off the jets in the plate as otherwise the air flow of some of the openings would be blocked. The raised portions are located between each opening in the plate, and the openings are arranged in a regular pattern to be described hereinafter.

Broadly, the invention comprises a system for promoting combustion of solid fuel comprising a diffuser manifold, a source of pressurized air and a conduit joining the air source to the diffuser manifold.

The manifold has a diffuser plate which has an arrangement of apertures therethrough which allow the air to exit the manifold in jets. A series of raised portions are provided in the upper surface of the plate.

According to a further broad aspect of the present invention there is provided a system for promoting combustion of fuel comprising a diffusion manifold including a diffuser plate having a definite geometrical pattern of apertures therethrough. A source of air under pressure is connected to the diffuser manifold. The openings have a predetermined area and distance between each other dependent on the type of fuel to be burnt. The velocity of air pushed through each of the openings by the source of air under pressure creates a turbulence zone about each of the openings. The openings are spaced apart such that the turbulence zones of adjacent openings are closely spaced to achieve a calibrated combustion zone having proper amount of air/fuel mixture to obtain a desired combustion of the fuel in the zone.

IN THE DRAWINGS

Figure 1:
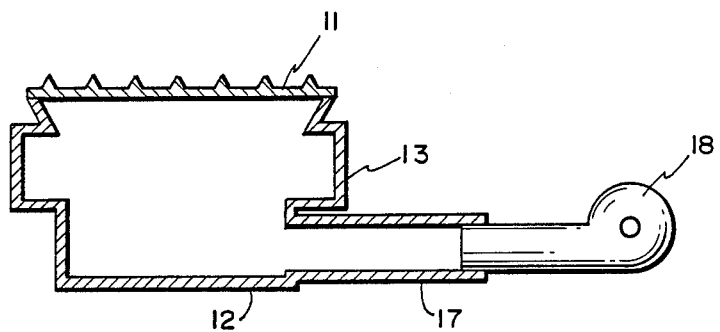
FIG. 1 is an elevational view of the diffuser conduit and air pump.
Figure 2:
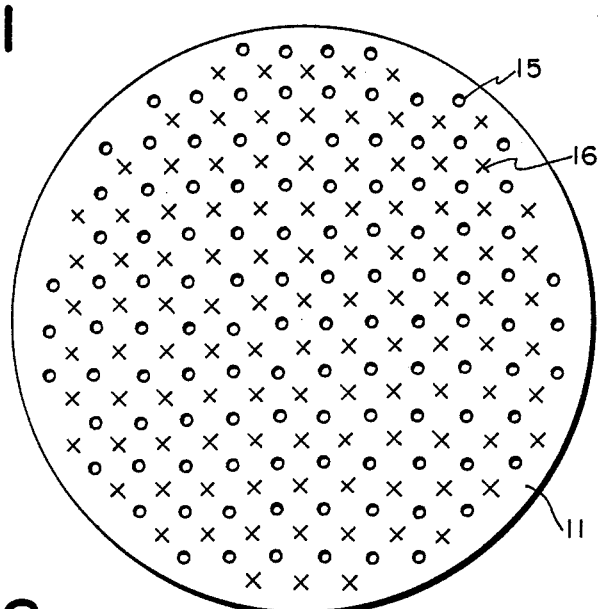
FIG. 2 is an enlarged top view of the diffuser plate.

According to FIG. 1 the diffuser includes an upper plate 11, a lower plate 12 and side walls 13, the combination forming a type of manifold. The upper plate includes a series of small openings 15 having a diameter within the range 0.6 mm to 1.4 mm and a preferred diameter of 1 mm. The holes or openings have a separation in both directions in the range 7 mm to 15 mm with a preferred distance of 10 mm. The relation between openings and distance can be made to burn other types of fuels; in other words, the diameter of the openings 15 and the distance between openings can be calibrated to burn different types of fuel.

As illustrated, each hole or opening is surrounded by a raised portion 16. Preferably, the raised portions have a height in the range of 0.2 mm to 5 mm with a preferred height of 1 mm. There is not a specific preferred shape of the raised portions, although they are not joined. In one embodiment, the raised portions are in the form of partial cylinders.

For practical reasons the diffuser plate is relatively thin, in the order of 0.2 mm to 6.4 mm, with a preferred thickness of 0.4 mm. It is manufactured from high temperature resistant material which will not oxidize. Stainless steel is contemplated, in which case the openings or holes are drilled or punched. As an alternate, ceramic may be used in which case the holes may be drilled or actually formed during the manufacturing process.

The raised portions 16 may be formed in the diffuser by a stamping process in the case of stainless steel or in the case of ceramic, formed during manufacturing process.

The overall size and shape of the diffuser is not critical and depends on the application. The unit may be cylindrical, square, rectangular, etc. The bottom of the diffuser, as illustrated in FIG. 1, is fitted with a conduit 17 thereby creating a type of manifold having an input by means of the conduit 17 and output through openings 15.

The opposite end of the conduit 17 is connected to a source of air such as an air pump 18.

In operation of the basic unit, therefore, a source of fuel such as a piece of wood or coal is placed on the surface of the diffuser plate, the raised portions preventing the wood from making intimate contact with the upper surface and thus some of the holes are not blocked obviously, it is not essential to have these raised portions if the fuel is irregular in shape and does not block too many openings.

Ignition of the wood is initiated by igniting a suitably positioned supply of paper or other readily combustible material. Ignition may also be initiated by electrical means in a manner which will be described hereinafter.

After ignition temperature is established, the air pump is turned on, and air is forced through the conduit and out of the diffuser through openings 15. Combustion of the wood follows virtually instantaneously and is prompted by the jets of air exiting through openings 15.

Figure 3A:
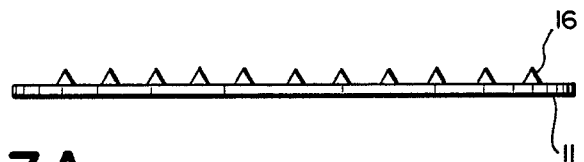
FIG. 3A is an enlarged cross sectional view of the diffuser plate.
Figure 3B:
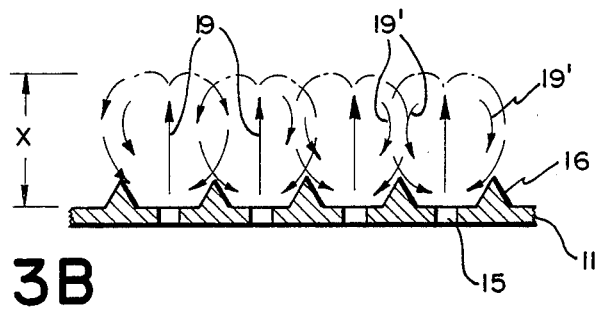
FIG. 3B is a fragmented enlarged section view illustrating air flow patterns.

The path of air flow taken by the air is best seen in FIG. 3B which shows the configuration thereof between the diffuser plate and the lower surface area of the burning fuel As herein shown, the positive upward velocity of air, shown by arrow 19, creates a negative pressure about the openings 15 causing a return air flow of turbulence around the openings, as shown by arrows 19'. As shown in this figure, the openings 15 are closely spaced and the return air streams intermesh. The spacing may be varied depending on the fuel being burnt whereby to maintain a combustion zone "X" which will achieve a desired combustion. If the openings are spaced too far apart, then there will be a space between the return air streams 19', thus creating "dead" combustion areas. The speed of the air passing through the orifices is dependent on the pressure of the air in the manifold and controls the rate of combustion, i.e., the burning time.

During combustion the unburned hydrocarbon gases formed thereby are carried radially outwardly from the point of combustion. As the gases reach the outer perimeter of the fuel in the plane of the plate 11, they meet injected air flowing through the openings in the peripheral area of the plate about the fuel location. These peripherally located jets of air provide combustion for unburnt hydrocarbons that are convected to the outside edge of the diffuser plate.

The gases, as a result, can be safely exhausted through appropriate conduits without the need for traditional chimneys.

Figure 4:
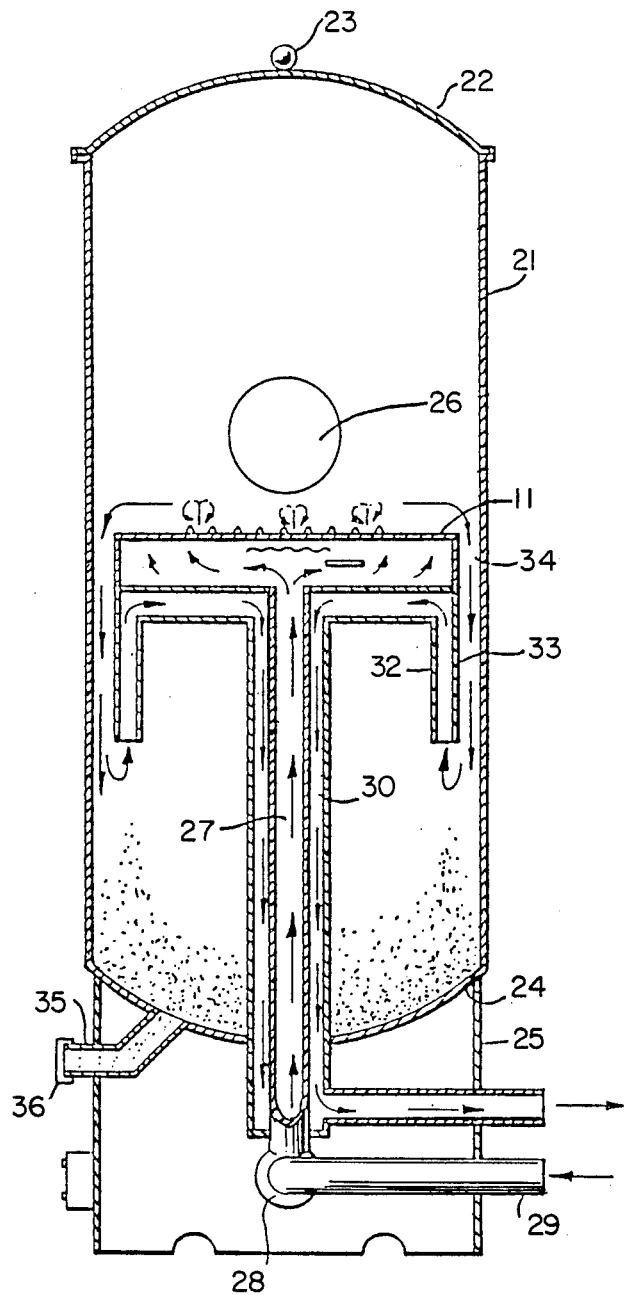
FIG. 4 is a cross sectional view of a heater in accordance with the invention.

FIG. 4 shows in cross section a stove encompassing the principles of the present invention. Upper loading of the combustion fuel is illustrated because of the obvious self-feeding effect of such a store but side or underneath feeding is also possible in alternate embodiments.

The stove comprises a housing 21 including a top 22 which is removably and sealably attached to the housing. A handle 23 attached to the top 22 provides a convenient and safe means whereby the housing may be opened for the purpose of loading and adding fuel. The housing also includes bottom 24 which follows a curved configuration for reasons to be explained hereinafter.

A lower stand or support 25 is attached to the housing 21.

The diffuser including plate 11 is held within the housing so as to define a combustion chamber thereabove. A piece of wood 26 is shown above the diffuser plate. Obviously, in practice the wood would contact the upper surface of the plate but is illustrated as being removed therefrom in order to illustrate air ptterns.

In this application a coaxial conduit is utilized. The center conduit 27 leads from the air pump 28 to the diffuser manifold. An air inlet to the pump is provided at 29. The outer section 30 of the coaxial conduit leads along the underside of the diffuser manifold with a downwardly projecting rim 32 around the outer edge. The outer edge of the diffuser manifold is also provided with a downwardly projecting rim 33 so that the two rims provide a channel leading to the outer section of the coaxial conduit.

As indicated in FIG. 4 a space 34 remains between the outer edge of the diffuser plate/manifold combustion and the housing.

A third conduit 35 is attached to the lowermost point of the curved bottom of the housing and leads through the support where a closing cap 36 is provided for ashes removal.

A temperature sensor (not shown) may be installed close by the combustion chamber for the purpose of comparing actual temperature with desired temperature. The output of the sensor is used through a control box to regulate the speed at which the air pump is operated.

An electric starter (not shown) such as a high tension spark device, or heater coil may be installed in the manifold close to the combustion zone. The starter should be made of high heat resistant material or made so it can be withdrawn manually or automatically from the combustion zone so that it will not be damaged during prolonged exposure to high temperatures; in this case, the starter is built inside the diffuser container near combustion and away from excessive heat zone.

In operation, the cover is removed and a source of solid fuel such as wood is placed on the diffuser plate. A small supply of readily combustible material such as paper is situated near the wood. The paper is ignited and the cover is reinstalled. Obviously, if the automatic electric starter is to be used, the cover is installed and then ignition is initiated.

As ignition temperature is reached, the air pump is turned on at a high level. Air is drawn into the pump via conduit 29 and forced by the pump to travel to the diffuser manifold along the inner conduit. The air fills the manifold and is forced out under pressure through the openings. This air and heat causes the solid fuel to ignite and the combustion thereof is promoted by the jets of forced air. The raised portions or stand-offs maintain a gap between the plate and the wood thus preventing blockage of the holes. The air forced through the openings immediately under the wood is forced to flow radially outwardly due to the convection path created by the evacuation conduit located beneath the diffuser plate and thus carrying with it by-products of combustion such as ash and unburned hydrocarbons.

These unburnt hydrocarbons are burned in the peripheral zone of the plate as previously described, thus providing an exhaust gas having substantially no hydrocarbons.

The gases and ash are carried by the forced air flow radially outwardly, and ultimately downwardly to the lower curved portion of the housing. Most of the heat is given up through the outer housing as the gases are forced down to the lower section between the diffuser and the housing. The gases, which by this time contain virtually no unburned components, are forced upwardly through the channel between rims 32 and 33 and to the outside via the outer chambers of the coaxial conduit.

As will be apparent, the heated gases exiting through the outer conduit impart by convection, heat to the input air so that it arrives preheated at the diffuser manifold. It is obvious that another heat exchanger can be added to remove the remaining heat so that the exiting gas will be cooled somewhat so that a conventional chimney is not required.

During a time when the stove is not operated the ashes which settle out may be removed from the lower portion of the housing via conduit 35.

It will be apparent that the size of each orifice (jet) sets a determined air flow, and the distance between each jet establishes interaction of the air flows one to another. This arrangement gives the advantage of burning the fuel in open air or in an airtight unit.

The relation between the size of the jet and the distance between each jet is chosen for optimum combustion as previously described.

The output of the air pump determines the velocity of the air flow.

As a result heat output can be varied by controlling the velocity of the air flow without altering the inherent efficiency of the combustion.

Thus the output of the air pump is the controllable element for heat genreation of a unit of fixed dimensions while the efficiency of the combustion, of wood in this case, is made in the manufacturing process by means of the relation between the size of openings and their distance one to another.

The speed of operation may be controlled manually by adjusting a control mounted on the support.

It will be apparent to one skilled in the art that the output of a temperature sensor mounted near the combustion zone or at other suitable locations on the unit can be compared against a selected temperature on a thermostat, for example. If the sensor temperature is below the selected temperature, the pump will operate at maximum speed for higher output. When the selected temperature is reached, the pump will switch to a second maintenance speed, sufficient to maintain combustion but far below maximum output. The control unit will cycle the pump in order to maintain a near constant temperature, if desired. Obviously, proportional type controls can be employed which will adjust, gradually, the pump speed or, in other words, the velocity of air entering the combustion zone.

Figure 5:
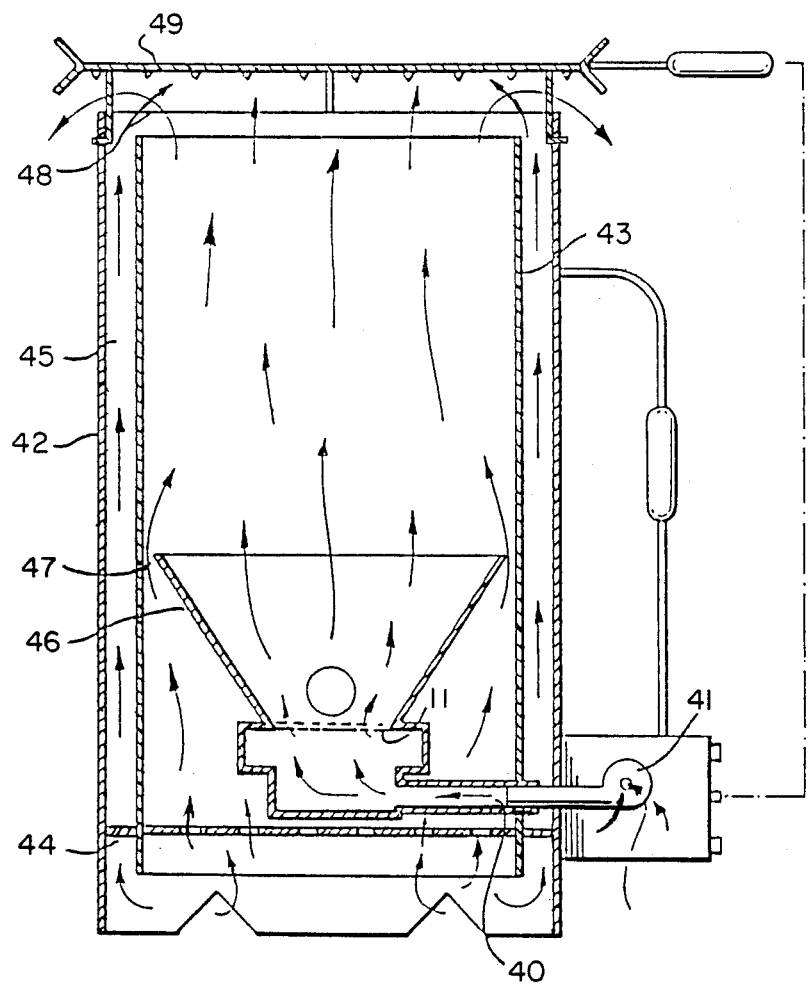
FIG. 5 is a cross sectional view of a cooker or barbeque.

A second specific application of the concept according to the invention is illustrated in FIG. 5. This unit serves as a heater which may be used, for example, as a barbeque and hot plate stove. Additionally, the unit provides a temperature controlled cooking surface.

As in the previously described embodiment, the heater unit is provided with a diffuser manifold having a diffuser plate complete with spaced apart apertures and raised portions between each aperture. A conduit 40 joins the diffuser manifold to an air supply, which for the present application is preferably a battery operated pump 41 so as to render the unit completely portable.

This modular cooker has a housing 42 and an inner shield 43. A locking bar 44 in the lower region of the shield supports the diffuser manifold 11 and conduit 40. The locking bar 44 also keeps the shield elevated above the bottom of the housing. The shield, when installed, is smaller in diameter and slightly shorter than the housing so that a vertical channel 45 remains between the two components.

A frusto-conical shaped member 46 rests on the diffuser manifold 11 as illustrated in FIG. 5, with the narrow portion of the frusto-conical member contacting the diffuser plate and the wide portion in juxtaposition to the shield. As illustrated, a narrow gap 47 remains between the cone and shield. The cone preferably has a slant of approximately 55° which serves to distribute evenly the heat to the above cooking surface.

An adjustable spacer 48 is provided at the top of the housing for the purpose of supporting a heat retaining plate 49 which serves as a cooking surface and also provides a gap for the exhaust flow so outside air does not interfere with secondary combustion, as explained further.

Figure 6A:
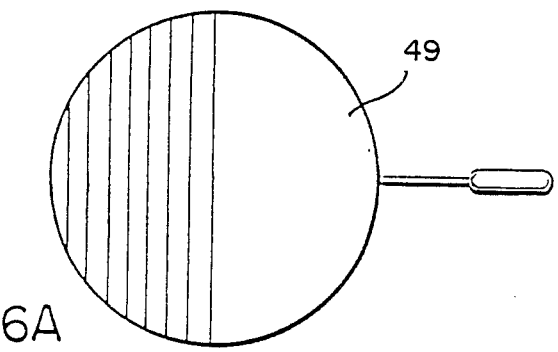
FIG. 6A is a view of one side of the cooker plate.
Figure 6B:
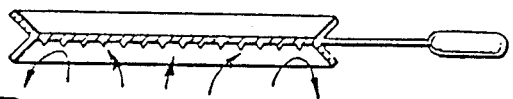
FIG. 6B is a cross sectional view of the cooker plate.

The cooking plate is made reversible, and is shown in FIG. 6A as having a smooth surface and in FIG. 6B as having a surface comprising a plurality of raised stripes. Both surfaces may be used for cooking depending on the type of food to be cooked.

Figure 7A:
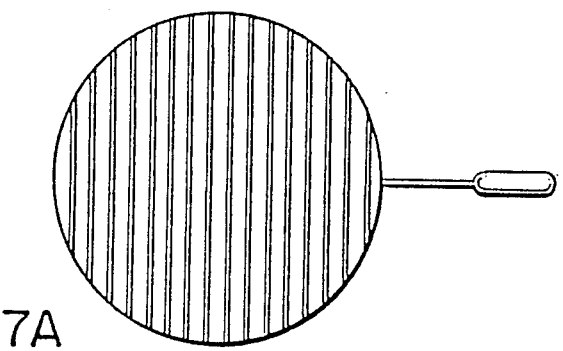
FIG. 7A is a view of the barbeque grid and grill.
Figure 7B:
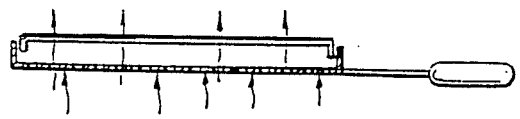
FIG. 7B is a cross sectional view of the grid.

The barbeque cooker has a grid with spaced bars to let exhaust heat through, similar to a radiant plate, as shown in FIG. 7B.

A heat sensor may be placed in the cooking plate or near the combustion zone so as to provide a means of providing feedback to the pump and hence to control the temperature of the cooling surface.

In operation, the fuel is ignited, as before, either manually or automatically. Once the combustion point has occurred the air pump is caused to be turned on so as to force jets of air to the underside of the fuel or wood. The heat generated by combustion together with produced unburned gases is carried upwardly. This upward movement creates a second air flow which brings outside air from beneath the housing through the openings and up between the shield and the cone. Additionally, air flows upwardly between the housing and the shield. The heated gases and secondary air meet in the vicinity of the cooker plate and create a zone of secondary combustion. This secondary combustion serves to produce additional heat heat beneath the cooker plate.

The exhaust gases exit through slightly restricted opening in the adjustable support. [Note that in this particular application, the heat and gases are directed toward the solid fuel and more fuel gases are emitted than if the gases were forced away from the solid fuel.]

In order to prevent excessive emission of fuel gases a slow combustion is required.

This results in a practical and useful portable battery operated unit because low speed is required and battery drain is not excessive.

As the cooker plate warms up, it approaches the desired temperature as set on the control unit. When the desired temperature is reached on the cooking surface, the air pump is turned off or to a setting which will lower the speed rate of combustion. When the cooker plate temperature falls below the set point, the pump is again speeded up automatically in order to increase the system temperature.

As illustrated suitable handles are maintained on the cooker plate and heating unit so as to permit easy handling for portable use.

It is within the ambit of the present invention to cover any obvious modifications of the examples of the preferred embodiment described herein, provided such modifications fall within the scope of the appened claims.

The embodiment of the invention in which an exclusive property or privilege is claimed are defined as follows:

1. A system for promoting combustion of fuel comprising:
   a diffusion manifold including a diffuser plate having an upper surface, a lower surface and a pattern of spaced apart openings therethrough, said openings having a predetermined diameter in the range of 0.6 to 1.4 mm and a distance between each other in the range of 7 mm to 15 mm;
   a source of fuel on the upper surface of said diffuser plate, exclusively;
   air pump means connected to said diffuser manifold for forcing air alone through said openings under such a pressure as to cause said air to exit on said upper surface of said diffuser plate in the form of small air jets of a given velocity; and
   means for controlling said air pressure to adjust said velocity of said air jets so as to create a turbulence zone on said upper surface of said diffuser plate about each of said openings, all of said turbulence zones being adjacent and forming together a combustion zone in the vicinity of said upper surface of said diffuser plate;
   the amount of air fed to said combustion zone to form with said fuel on said upper surface a proper amount of air/fuel mixture being determined by the size of said openings and the distance between each other, and being exclusively controlled by said air pressure controlling means.

2. The system of claim 1 wherein said diffuser manifold further includes side walls and a bottom plate to which said conduit is connected.

3. The system of claim 1 wherein said diffuser plate is heat resistant.

4. The system of claim 1 wherein said diffuser plate is non-oxidizing.

5. The system of claim 2, wherein said diffuser plate is ceramic.

6. The system of claim 2, wherein said diffuser plate is stainless steel.

7. The system of claim 1 wherein said apertures have a diameter of 1 m.

8. The system of claim 1 wherein said distance between said apertures is 10 mm.

9. The system of claim 1 wherein the thickness of said diffuser plate is in the range of 0.2 mm to 6 mm.

10. The system of claim 9 wherein said thickness of said plate is 0.4 mm.

11. The system of claim 1 wherein said fuel is wood.

12. The system of claim 38, wherein said diffuser plate has a plurality of raised portions between said openings on said upper surface.

13. The system of claim 12 wherein the height of said raised portions is in the range of 0.2 mm to 5 mm.

14. The system of claim 12 wherein the height of said raised portions is 1 mm.

* * * * *